(12) United States Patent
Frachtenberg et al.

(10) Patent No.: US 9,779,029 B2
(45) Date of Patent: Oct. 3, 2017

(54) CACHE REPLACEMENT POLICY FOR DATA WITH STRONG TEMPORAL LOCALITY

(71) Applicant: Facebook, Inc., Menlo Park, CA (US)

(72) Inventors: Eitan Frachtenberg, Palo Alto, CA (US); Yuehai Xu, Detroit, MI (US)

(73) Assignee: Facebook, Inc., Menlo Park, CA (US)

( * ) Notice: Subject to any disclaimer, the term of this patent is extended or adjusted under 35 U.S.C. 154(b) by 319 days.

(21) Appl. No.: 13/670,147

(22) Filed: Nov. 6, 2012

(65) Prior Publication Data

US 2014/0129779 A1    May 8, 2014

(51) Int. Cl.
| | | |
|---|---|---|
| *G06F 12/12* | (2016.01) | |
| *G06F 12/122* | (2016.01) | |
| *G06F 12/123* | (2016.01) | |
| *G06F 12/121* | (2016.01) | |

(52) U.S. Cl.
CPC .......... *G06F 12/122* (2013.01); *G06F 12/123* (2013.01); *G06F 12/121* (2013.01); *G06F 2212/283* (2013.01); *G06F 2212/69* (2013.01)

(58) Field of Classification Search
CPC ........... G06F 2212/69; G06F 2212/154; G06F 2212/163; G06F 2212/314; G06F 17/30902
USPC .................................................. 711/133–136
See application file for complete search history.

(56) References Cited

U.S. PATENT DOCUMENTS

| | | | | |
|---|---|---|---|---|
| 5,432,919 A | * | 7/1995 | Falcone et al. ................ | 711/134 |
| 5,592,432 A | * | 1/1997 | Vishlitzky et al. ....... | 365/230.03 |
| 5,594,885 A | * | 1/1997 | Lautzenheiser ..... | G06F 11/1435 |
| | | | | 711/118 |
| 5,778,442 A | * | 7/1998 | Ezzat et al. .................... | 711/159 |
| 6,209,062 B1 | * | 3/2001 | Boland et al. ................. | 711/134 |
| 6,510,493 B1 | * | 1/2003 | Liu et al. ....................... | 711/133 |
| 6,542,966 B1 | * | 4/2003 | Crawford et al. ............. | 711/133 |
| 6,715,039 B1 | * | 3/2004 | Michael et al. ............... | 711/133 |
| 6,807,619 B1 | * | 10/2004 | Ezra et al. ..................... | 711/219 |
| 6,996,676 B2 | * | 2/2006 | Megiddo et al. ............. | 711/129 |

(Continued)

OTHER PUBLICATIONS

Johnson and Shasha ("2Q: A Low Overhead High Performance Buffer Management Replacement Algorithm" Proceedings of the 20th VLDB Conference Santiago, Chile, 1994).*

(Continued)

*Primary Examiner* — Hashem Farrokh
*Assistant Examiner* — Tracy A Warren
(74) *Attorney, Agent, or Firm* — Perkins Coie LLP

(57) ABSTRACT

Various cache replacement policies are described whose goals are to identify items for eviction from the cache that are not accessed often and to identify items stored in the cache that are regularly accessed that should be maintained longer in the cache. In particular, the cache replacement policies are useful for workloads that have a strong temporal locality, that is, items that are accessed very frequently for a period of time and then quickly decay in terms of further accesses. In one embodiment, a variation on the traditional least recently used caching algorithm uses a reuse period or reuse distance for an accessed item to determine whether the item should be promoted in the cache queue. In one embodiment, a variation on the traditional two queue caching algorithm evicts items from the cache from both an active queue and an inactive queue.

20 Claims, 9 Drawing Sheets

(56) References Cited

U.S. PATENT DOCUMENTS

| | | | |
|---|---|---|---|
| 8,806,139 B2* | 8/2014 | Busaba | G06F 12/126 711/136 |
| 2008/0140937 A1* | 6/2008 | Nalawade | G06F 12/0871 711/119 |
| 2013/0145104 A1* | 6/2013 | Hsu | G06F 12/126 711/141 |

OTHER PUBLICATIONS

Jiang and Zhang ("LIRS: An Efficient Low Inter-reference Recency Set Replacement Policy to Improve Buffer Cache Performance" 2002 ACM Sigmetrics, pp. 31-42, Jun. 2002).*

Megiddo and Modha ("ARC: A Self-Tuning, Lowoverhead Replacement Cache" USENIX (FAST), Mar. 2003).*

Bansal and Modha ("CAR: Clock with Adaptive Replacement" USENIX (FAST), pp. 187-200, Jul. 2004).*

Jiang and Zhang ("CLOCK-Pro: An Effective Improvement of the CLOCK Replacement" 2005 USENIX Annual Technical Conference, pp. 323-336, Apr. 2005).*

Jianbin et al. ("2Q/F: A new Replacement Algorithm for Ro-RAT System", 2009 WRI World Congress IEEE, pp. 91-95, Apr. 2009).*

Atikoglu et al ("Workload Analysis of a Large-Scale Key-Value Store" ACM 2012 SIGMETRICS, pp. 53-64, Jun. 2012)—noted that inventors are included authors.*

Zhou, Y., Philbin, J.F. and K. Li, "The Multi-Queue Replacement Algorithm for Second Level Buffer Cache," Proceedings of the 2001 USENIX Annual Technical Conference.*

Jianbin, K., Haishan, W., Cheng, M. and J. Huibo. "2Q/F: A new Replacement Algorithm for Ro-RAT System," World Congress on Computer Science and Information Engineering, 2009, pp. 91-95.*

* cited by examiner

CACHE REPLACEMENT POLICY FOR DATA WITH STRONG TEMPORAL LOCALITY

BACKGROUND

Cache memories are used to accelerate access to data on slow storage by managing a subset of the data in smaller, faster, and, typically, more expensive storage. Caches come in many shapes and forms, and can be embodied in hardware, such as central processing unit (CPU) caches, and software, such as Memcached. They can also be layered across several storage layers.

Caches can improve performance when the accessed data is not uniformly random, but is instead distributed based on locality properties, for example, spatial locality and temporal locality. With data having spatial locality, if a user accesses one datum, it is likely that the user or another user will access other data that are close or similar to it. With data having temporal locality, if a user accesses one datum, it is likely that the user or another user will access the same datum again soon. Locality gives a measure of predictability to data access patterns, so it is advantageous to store in the smaller cache only those items that are predicted to be recalled soon. The ratio of all data accesses that can be served by the cache is called the hit ratio. The hit ratio is one of the main metrics of the successful implementation of a cache.

Improving a cache's hit ratio can have large economical impact. There have been many efforts to design better algorithms to predict which items to store in the cache and which to evict to make room for more items more likely to be requested. One of the most commonly used and successful cache-replacement policies is called Least-Recently-Used (LRU) algorithm.

With the LRU algorithm, all items in the cache are logically arranged in a sorted queue, with the most recently accessed datum at the head of the queue, and the least recently accessed datum at the tail. Whenever an item is accessed, it is promoted to the head of the queue, pushing all other items in the queue one position down. Since the cache size, and correspondingly, queue length, is finite, every time a new item is inserted in a full cache, one item must be evicted from the cache to make room for the new item. With the LRU algorithm, that datum is the tail of the queue, or the least-recently accessed datum.

BRIEF DESCRIPTION OF THE DRAWINGS

Examples of techniques for implementing cache replacement policies are illustrated in the figures. One or more embodiments of the present disclosure are illustrated by way of example and not limitation in the figures of the accompanying drawings.

DETAILED DESCRIPTION

Various cache replacement policies are described whose goals are to identify items for eviction from the cache that are not accessed often and to identify items stored in the cache that are regularly accessed that should be maintained longer in the cache. In particular, the cache replacement policies are useful for workloads that have a strong temporal locality, that is, items that are accessed very frequently for a period of time and then quickly decay in terms of further accesses. In one embodiment, a variation on the traditional least recently used caching algorithm uses a reuse period or reuse distance for an accessed item to determine whether the item should be promoted in the cache queue. In one embodiment, a variation on the traditional two queue caching algorithm evicts items from the cache from both an active queue and an inactive queue.

Various aspects and examples of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the technology. Certain terms may even be emphasized below; however, any terminology intended to be interpreted in any restricted manner will be overtly and specifically defined as such in this Detailed Description section.

Figure 1:
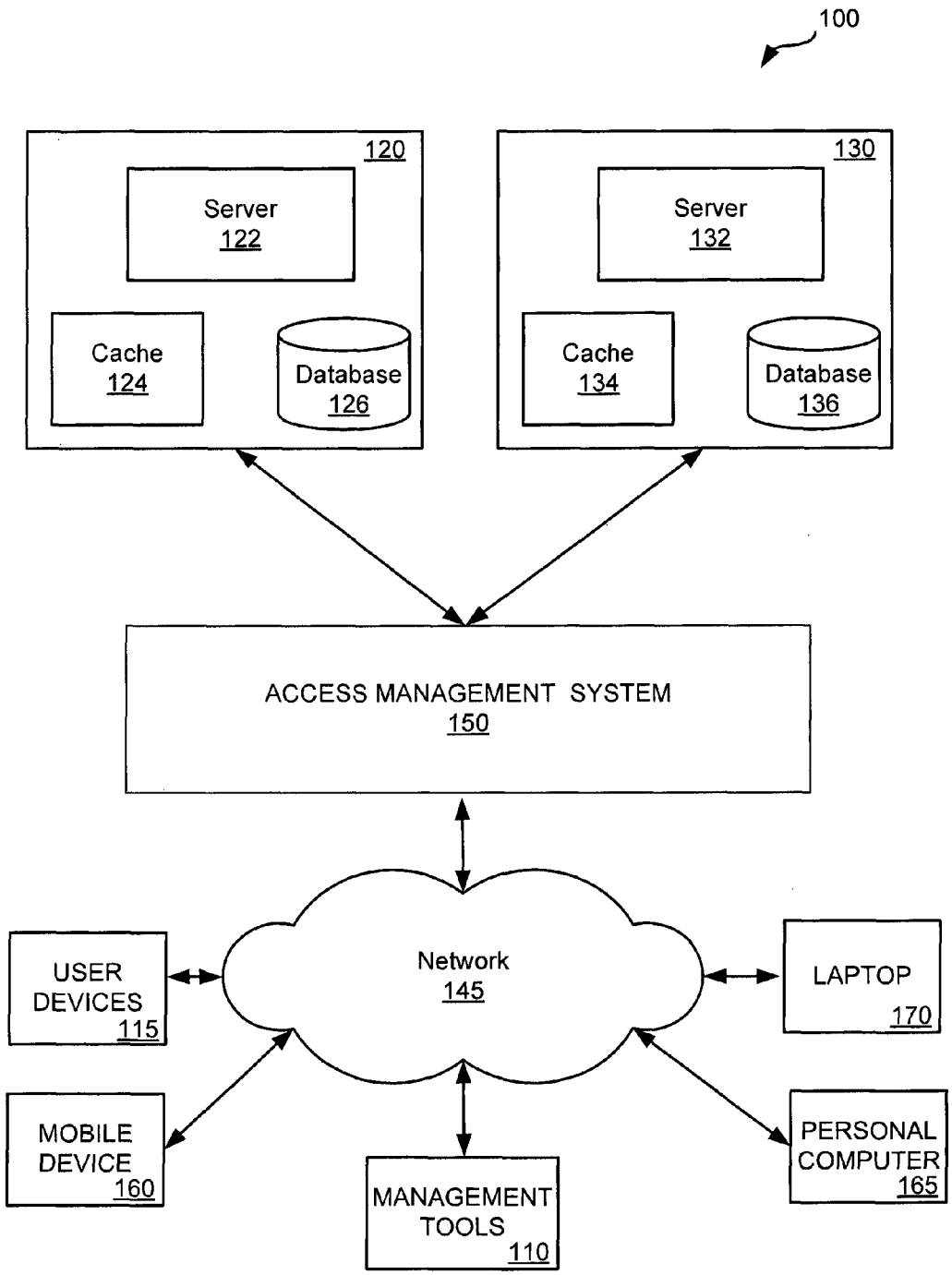
FIG. 1 depicts a block diagram of a networked-based environment in which the cache replacement policies described in the disclosure can be implemented according to an embodiment of the present disclosure.

FIG. 1 illustrates an example of a networked-based environment 100 in which some embodiments of the present invention may be utilized. Companies can store a tremendous amount of data (e.g., photographs, messages, e-mails, electronic documents, or healthcare records) and related analytics (e.g., usage analytics). The data can be submitted through various management tools 110, user devices 115, mobile devices 160, personal computers 165, laptops 170, and/or other devices to allow the data to be stored on one or more databases in data centers 120 and 130. As illustrated in FIG. 1, these devices and tools may use network 145 to submit and retrieve information from the data centers 120 and 130. Various embodiments of the present invention use access management system 150 to manage the access that the users (both end-users and employees) have to the information and data stored in data centers 120 and 130.

Each data center 120, 130 includes at least one web server 122, 132, at least one cache 124, 134, and at least one database 126, 136. While two data centers 120, 130 are shown, more or fewer data centers can receive user requests for data in the system.

User device 115 can be any computing device capable of receiving user input as well as transmitting and/or receiving data via the network 145. In one embodiment, user device 115 is a conventional computer system, such as a desktop 165 or laptop computer 170. In another embodiment, user device 115 may be mobile device 160 having computer functionality, such as a personal digital assistant (PDA), mobile telephone, smart-phone or similar device. User device 115 is configured to communicate with access management system 150, and/or the financial account provider (not shown) via the network 145. In one embodiment, user device 115 executes an application allowing a user of user device 115 to interact with the access management system 150. For example, user device 115 can execute a browser application to enable interaction between the user device 115 and access management system 150 via the network 145. In another embodiment, user device 115 interacts with access management system 150 through an application programming interface (API) that runs on the native operating system of the user device 115, such as IOS® or ANDROID™. A user can use a user device 115 to send a data request for one or more items stored in the database 126, 136 and/or the cache 124, 134.

User devices 115 can be configured to communicate via the network 145, which may comprise any combination of local area and/or wide area networks, using both wired and wireless communication systems. In one embodiment, network 145 uses standard communications technologies and/or protocols. Thus, network 145 may include links using technologies such as. Ethernet, 802.11, worldwide interoperability for microwave access (WiMAX), 3G, 4G, CDMA, digital subscriber line (DSL), etc. Similarly, the networking protocols used on network 145 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over network 145 may be represented using technologies and/or formats including hypertext markup language (HTML) or extensible markup language (XML). In addition, all or some of links can be encrypted using conventional encryption technologies such as secure sockets layer (SSL), transport layer security (TLS), and Internet Protocol security (IPsec).

The LRU cache replacement policy described above works for many workloads that exhibit temporal locality because items that are accessed frequently will remain near the top of the queue, decreasing their probability of eviction, and thus increasing the probability of a hit when they are requested again. It is also highly likely that the items will be requested again because of their temporal locality characteristic. However, there are a few situations in which LRU performs suboptimally, even in the presence of strong temporal locality.

The first situation involves a large number of compulsory misses in the requested data. Many workloads use a certain amount of data that is requested only once over a long period of time. The first time such an item is requested, it will necessarily miss in the cache, the so-called compulsory miss, and the cache will typically store the newly-fetched value for later reuse. LRU dictates that the datum is stored at the head of the cache. But if it is only used once for its entire lifetime in the LRU queue, the datum occupies valuable cache memory space for a relatively long period of time until it is evicted from the cache. That memory space could have been used by more popular data.

The second situation involves different reuse periods. Some data are accessed regularly, but at a frequency that is still lower than a typical lifetime of the LRU queue, i.e., the time it takes for a cached item to be evicted from the cache. So with the LRU policy, the regularly accessed data may be evicted before being recalled again, and then missed upon the next recall, and reinserted into the cache. To predict the access to these items better, some algorithms (such as LIRS, a low inter-reference recency set replacement algorithm) keep track of the time between subsequent accesses of data, and opt to keep repeating data in the cache over non-repeating data, even if the reuse period is longer than the LRU queue. Other variations can maintain more than one queue based on priorities.

The third situation involves workloads with strong temporal locality and is addressed in this disclosure. Items with strong temporal locality are accessed very frequently for a certain amount of time, and then the access requests for the items quickly decay. This scenario can be common with accessed data in social networks. People tend to read and interact with new content from their connections frequently and shortly after its introduction, but later, it is rarely accessed again. With LRU, these items will be served well in the cache during the initial period because they will be accessed often and remain near the top of the queue. But after the last access, they may never be requested again. Then putting the items at the top of the queue for the last access is inefficient.

Lax LRU Cache Replacement Algorithm

Some variants of the LRU cache replacement policy, such as LIRS, as mentioned above, keep track of the reuse period of cache items, i.e., the time between two consecutive accesses to the same item, or reuse distance, i.e., the number of different items between two consecutive accesses to the same item. The reuse period or reuse distance is used for detecting slow-cycle elements and keeping those in the cache, instead of evicting them from the cache. The reuse period can be used in a novel way with a lax LRU algorithm, as described below.

Figure 2:
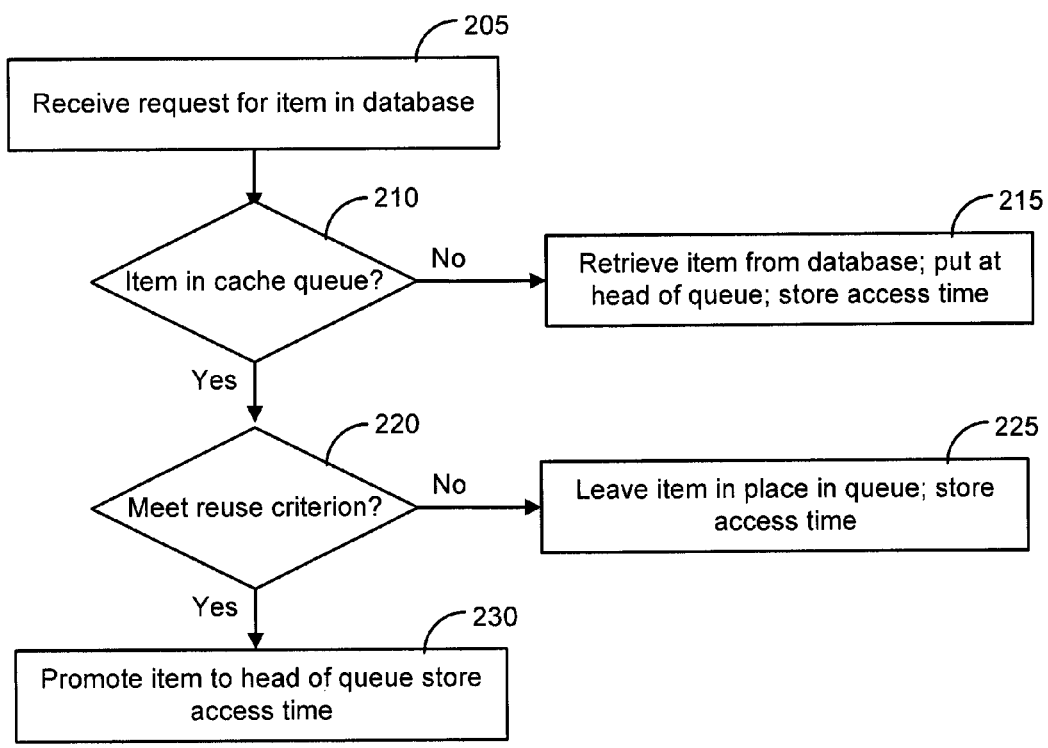
FIG. 2 is a flow diagram illustrating an example process for implementing a lax LRU cache replacement policy according to an embodiment of the present disclosure.

FIG. 2 is a flow diagram illustrating an example process for a lax LRU cache replacement algorithm. The algorithm uses a reuse period for detecting decaying items and preventing cache pollution by preventing promotion of these items to the top of the LRU queue.

The lax LRU algorithm is based upon the basic LRU algorithm. In addition, the reuse period of accessed items are tracked, for example, the elapsed time between the last two consecutive accesses, or the average time between every pair of consecutive accesses.

At block 205, the system receives a request for an item in the database. Next, at decision block 210, the system determines if the requested item is stored in the cache queue. If the item is not found in the queue (block 210—No), at block 215 the item is retrieved from the database in response to the user request. The item is then placed at the head of the queue, and the access time is stored with the item for determining a reuse period.

If the item is found in the queue (block 210—Yes), at decision block 220, the system determines if the reuse period of the item meets a pre-selected reuse criterion. Non-limiting examples of reuse criteria include the latest reuse period being shorter than a predetermined threshold, and the reuse period being shorter than a dynamic threshold, such as twice the average reuse period for the item or for other items.

If the item does not meet the reuse criterion (block 220—No), at block 225 it is not moved to the head but left in the same place in the queue, and the access time is stored. If the item does meet the reuse criterion (block 230), at block 230 it is promoted to the head of the queue, and the access time is stored.

This caching algorithm is termed "lax LRU" because it does not always change a requested item's position in the queue. The benefit of this approach is that items stay near the head of the queue for as long as they are popular and frequently accessed. However, if requests for the item start becoming less frequent, it is an indication that the item will not be needed in the cache for much longer, and it is allowed to progress through the cache until it is evicted.

This system can also be tolerant of a single request made after a series of requests. For example, consider the scenario where an item is requested every minute and then not touched for an hour while everyone is at lunch. As people return from lunch, the item is accessed again every minute for a while. Then under the lax LRU policy, during the first period of activity, the item will hover near the head of the queue as is expected for unmodified traditional LRU, and it will likely always be hit in the cache, assuming adequate cache capacity. After the hour of inactivity has passed, if the item is still in the cache, it will be hit on the first access. However, it will not be moved in the queue if the threshold criteria have not been met. Then on the next few frequent accesses, if the reuse criterion is met, the item will again be promoted to the head of the queue, thus, prolonging its lifetime in the cache and increasing the effective hit rate. However, if only one person requests the item after lunch, it will not be promoted, and thus its eviction will not be delayed, in favor of making room in the cache for another item that may be more popular.

Variations on Lax LRU and Traditional LRU

There are other ways to implement the same principle where decaying items are evicted from the cache sooner than with the traditional LRU algorithm. In one variation, when an item in the cache is re-requested, rather than promoting it to the head of the queue, it is promoted upwards in the queue by a fixed amount, e.g., 100 positions. Alternatively, the re-requested item can be promoted upwards by some amount that is generally inversely proportional to the latest reuse period. The purpose of this variation is to ensure that items hover near the top of the queue only while they are frequently accessed, or 'hot', and otherwise vacate the queue more quickly when they are 'cold'.

In one embodiment, items can be promoted by a certain fixed number of positions or by a variable number of positions based on the position of the item in the queue. In one embodiment, items are promoted only after they have fallen to a certain point within the queue. For example, an item will only be promoted if it is re-accessed after it reaches the half-way point or some other point in the queue.

In one embodiment, the reuse time for an item can be tracked and fit to a function, such as a linear function, an exponential function, or a quadratic function. Then it may be possible to estimate when the next access will be and whether the item should be promoted within the queue, and/or how far the item should be promoted within the queue.

Figure 3:
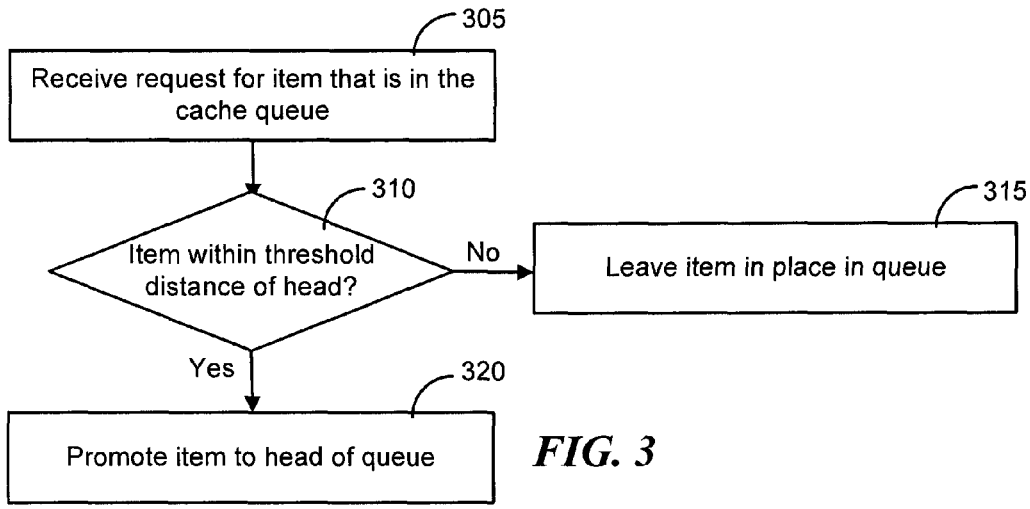
FIG. 3 is a flow diagram illustrating an example process for a variation on the LRU cache replacement policy that does not compute a reuse period according to an embodiment of the present disclosure.

Another variation may be desirable if the extra memory space and processing power used to track the reuse period of requested items are not feasible or available. For example, traditional LRU does not track the reuse period. FIG. 3 is a flow diagram illustrating an example process for a variation on the LRU cache replacement policy that does not compute and store a reuse period.

At block 305, the system receives a request for an item that is in the cache queue. If a request is received for an item that is not in the cache queue, the requested item is placed at the head of the queue.

Then at decision block 310, the system determines if the item is within a pre-defined threshold distance of the head of the cache queue, also called the active region. If the item is within the active region near the top of the queue (block 310—Yes), at block 320 the item is promoted to the head of the queue. If the item is not within the active region of the queue (block 310—No), at block 315 the item is left in its place in the queue.

With this algorithm, items are promoted to the head of the queue only if they are already near the top of the queue, where "near" is defined to be within some predefined threshold distance, measured in the number of items separating the item from the current head of the queue. Thus, when items are not accessed for a sufficiently long duration, they move out of the active area of the queue towards the tail of the queue, from which they cannot be promoted again until evicted from the queue. This policy prevents pollution of the cache by inactive items. Further, if an item grows active again after being moved to the inactive area, as is possible in the lunch scenario above, it would still get evicted and would have to be reinserted into the cache by demand.

Figure 4:
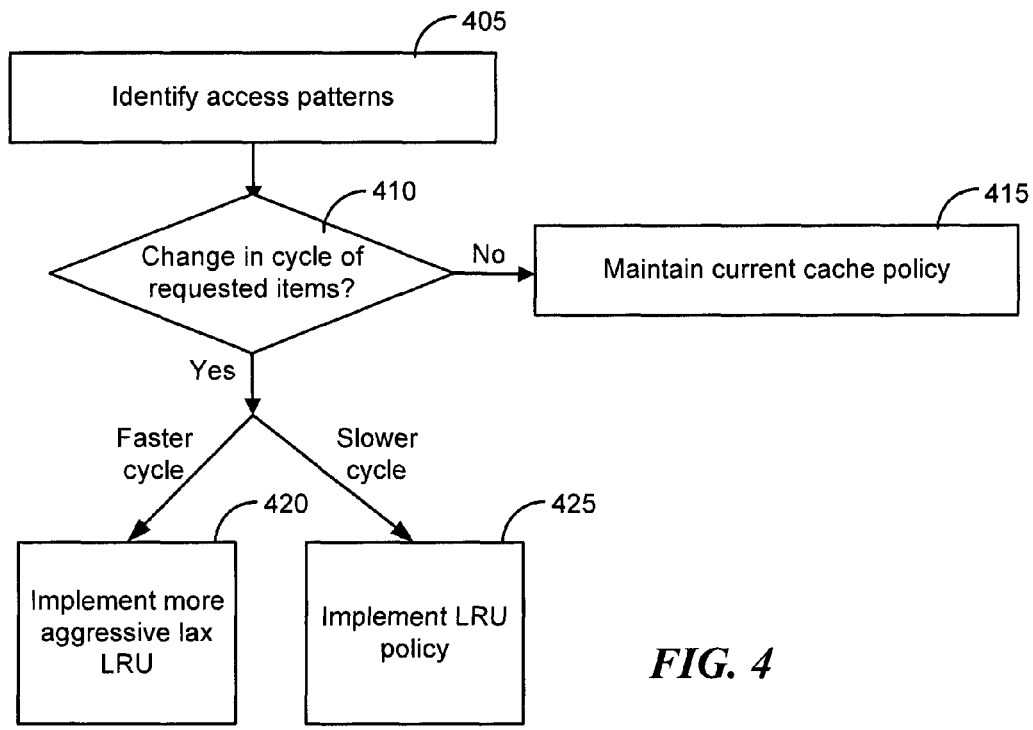
FIG. 4 is a flow diagram illustrating an example process for a dynamic variation on the LRU cache replacement policy according to an embodiment of the present disclosure.

A different variation adjusts the cache replacement algorithm dynamically, reacting to changes in workload characteristics. For example, access patterns during the day may be different from access patterns during the night. FIG. 4 is a flow diagram illustrating an example process for a dynamic variation on the LRU cache replacement policy.

At block 405, the system identifies temporal data access patterns. For example, data could be accessed with a diurnal or weekly pattern. Then at decision block 410, the system determines if there is a change in the identified cycle of requested items. If there is no change in the cycle of the access patterns (block 410—No), at block 415, the system maintains the current cache policy, whether traditional LRU, lax LRU, or a variation of either of these policies.

If there is a change to faster cycling of the access patterns (block 410—faster cycle), at block 420 the system implements a more lax LRU caching algorithm that evicts the least frequently accessed items faster from the cache than the traditional LRU algorithm. If there is a change to slower cycling of the access patterns (block 410—slower cycle), at block 425 the system can implement the traditional LRU policy, retaining items longer. Thus, this is an adaptive policy where the system can revert back to traditional LRU, or alternatively, a more lax LRU, based on the changes in reuse period identified by the system. In one embodiment, more than two types of caching algorithms can be implemented based on the speed of the cycling of the access patterns. That is, the period for retaining infrequently accessed items can be adjusted across a spectrum of parameters from a reuse criterion that behaves just like traditional LRU (i.e., promotes all items when accessed) to a reuse criterion that only promotes the most frequently reused items (e.g., promotes an item only after 100 accesses).

The variations described above as well as the "lax LRU" algorithm use externally-set parameters for their heuristics, such as different threshold values. The disadvantage of using parameters is that they need to be carefully tuned, and even then, the selected parameters may not respond optimally to changing workloads or assumptions. One solution is to use a variation of the traditional LRU policy that is both self-adaptive and self-tuning, thus requiring little or no parameterization.

Figure 5:
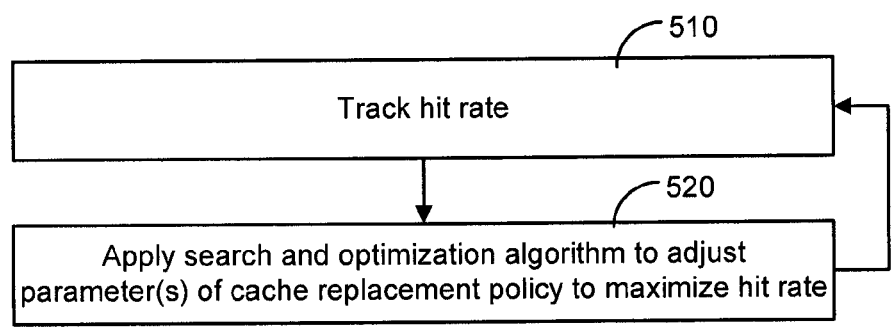
FIG. 5 is a flow diagram illustrating an example process for implementing a self-adaptive and self-tuning variation on the traditional LRU cache replacement policy according to an embodiment of the present disclosure.

FIG. 5 is a flow diagram illustrating an example process for implementing a self-adaptive and self-tuning variation on the traditional LRU cache replacement policy. At block 510, the system tracks the hit rate of the system. Then at block 520, the system applies a search and optimization algorithm to adjust internally-set parameters, trying to maximize the system's hit rate. Then the process returns to block 510 to track the new hit rate after adjustment of the internally-set parameters.

In this variation, the algorithm is constantly looking at the previous decisions it made and the resulting hit rate, and adjusts its own parameters in a constant search to maximize the hit rate. For example, the algorithm can examine the latest change it made to its parameters, such as decreasing the reuse-time threshold, and observe the effect on hit rate based on that decision. The algorithm can decrease the threshold further if the hit rate went up, or vice versa.

The method described in the self-adaptive variation can be considered a hybrid of "lax LRU" with a local search and optimization method called "hill climbing" or "gradient climbing". There are search and optimization algorithms, both local and global, with different degrees of dynamic complexity, which can be successful candidates for this hybridization. Non-limiting examples of search and optimization algorithms include simulated annealing, Tabu search, various evolutionary algorithms such as evolutionary strategy, genetic algorithms, evolutionary programming, genetic programming, and others.

The above discussion proposes various cache replacement policies that are designed to improve hit rates over the traditional LRU policy. Some of the policies are static with fixed rules on when to deviate from the traditional LRU algorithm. Other policies are dynamic with rules or parameters that can adapt to the workload at hand. In all cases, the goal is to predict which items are no longer needed in the cache due to the strong temporal locality of the workload and accelerate their eviction to make room for other, more useful data.

Prolonging Item Lifetime of Useful Items in the Cache Queue

The lax LRU algorithm focuses on identifying items that are no longer hot, i.e.: frequently accessed, or were never hot and evicting them sooner from the queue than the traditional LRU policy would. A complementary approach is to identify items that are hot and keep them longer in the cache. Previous algorithms that attempt to do this have been proposed and include LIRS, CLOCK-Pro, and two-queue.

The LIRS policy uses an item's most recent Inter-Reference Recency (IRR) as the metric to identify which item should be evicted from the queue. IRR refers to the number of other items accessed between two consecutive references to a particular item. LIRS assumes that if the IRR of an item is large, the next IRR of it is likely to be large again. Based on this assumption, LIRS maintains two sets to store items with high IRR (HIR) or low IRR (LIR) respectively. HIR items are evicted from the queue to make room for new ones. When the recency of an HIR item is smaller than that of LIR items, the HIR item will be put into the LIR set. Similarly, LIR items with higher recency will be put into the HIR set. In this way, the size of the HIR set and the LIR set are maintained automatically.

The CLOCK-Pro policy integrates the idea of LIRS into CLOCK, which is a lock-free algorithm designed to alleviate lock contention. This policy also uses IRR rather than recency to identify the items to be evicted.

The two-queue policy maintains an active queue and an inactive queue to store items. Items in the tail of the inactive queue are candidates to be evicted, and newly requested items are stored at the head of the inactive queue. Items that are already in either the active queue or the inactive queue are put at the head of the active queue when they are requested. The ratio of the size of these two queues is constant, so items in the tail of the active queue are put into the head of the inactive queue when the number of active queue items is greater than defined by the ratio.

Some of these methods use additional information, such as reuse period or reuse distance (IRR in LIRS), just as lax LRU does. New methods are described below that accommodate workloads with strong temporal locality.

In one embodiment, a caching algorithm can be adapted to accommodate three workload characteristics: 1) items that are accessed within a short period of time and then not accessed anymore, 2) items that are accessed frequently on a regular basis, and 3) items that are accessed and then have a strong decaying pattern before being accessed again, where the items are re-accessed periodically. The traditional LRU algorithm is suboptimal for a workload that exhibits these characteristics. An alternate algorithm based on a variation of the two queue algorithm is better suited.

To accommodate the first characteristic where items have a short lifetime, the items are placed in an inactive queue that has a very short lifetime. Then these items are evicted from the inactive queue before being re-accessed and are thus prevented from reaching the active queue.

To accommodate the second characteristic where items are accessed frequently on a regular basis, items are promoted from the inactive queue to the active queue. Then active queue items are promoted to the head of the active queue when re-accessed, and the items remain in the active queue.

To accommodate the third characteristic where accessed items have a strong decaying pattern before being repeatedly accessed on a regular basis, the active queue is made long enough so that the items do not decay out of the active queue. For example, if items are known to be accessed every 12 hours, the lifetime of the active queue should be at least 12 hours long.

For items that reach the active queue but are not accessed periodically, these items should be pushed out of the cache sooner. Thus, tail items in the active queue should be evicted rather than being put back in the inactive queue, as with the traditional two-queue algorithm.

In one embodiment, the two-queue algorithm is modified according to two principles. The modified two-queue algorithm is called the recycling two queue algorithm. First, items can be evicted from the tail of the active queue (AQ) and the tail of the inactive queue (IQ) when the total capacity of the queue has been reached. To determine which item should be evicted the ratio of the lengths of the AQ and IQ is determined. The ratio of the length of the AQ to the length of the IQ should remain within a certain predetermined range. If the ratio is too high, the tail item of the AQ should be evicted. Otherwise, the tail item of the IQ should be evicted.

Second, an item may be 'recycled' before being evicted from the IQ. Each item is associated with a 'recycle' bit, originally set to zero. If a tail item of the inactive queue is about to be evicted, but its recycle bit is still at zero, the system sets the recycle bit to one, and the item is promoted to head of the IQ, evicting a different item instead. Items that have a recycle bit that has been set will be evicted normally. The recycle bit effectively doubles the lifetime of items in the IQ at the cost of one additional bit per element. More than one recycle bit can be used to further increase the lifetime of items in the IQ. For example, if two recycle bits are used, the lifetime of items in the IQ can be quadrupled.

Figure 6A:
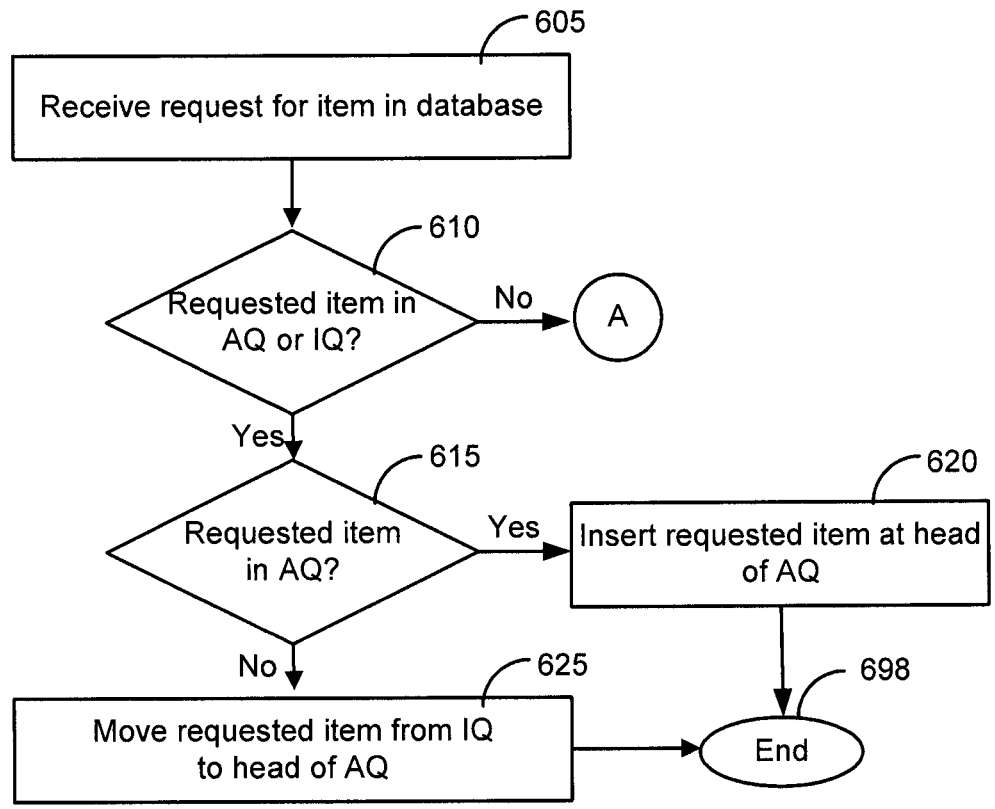
FIGS. 6A and 6B show a flow diagram illustrating an example process for implementing the recycling two queue algorithm according to an embodiment of the present disclosure.
Figure 6B:
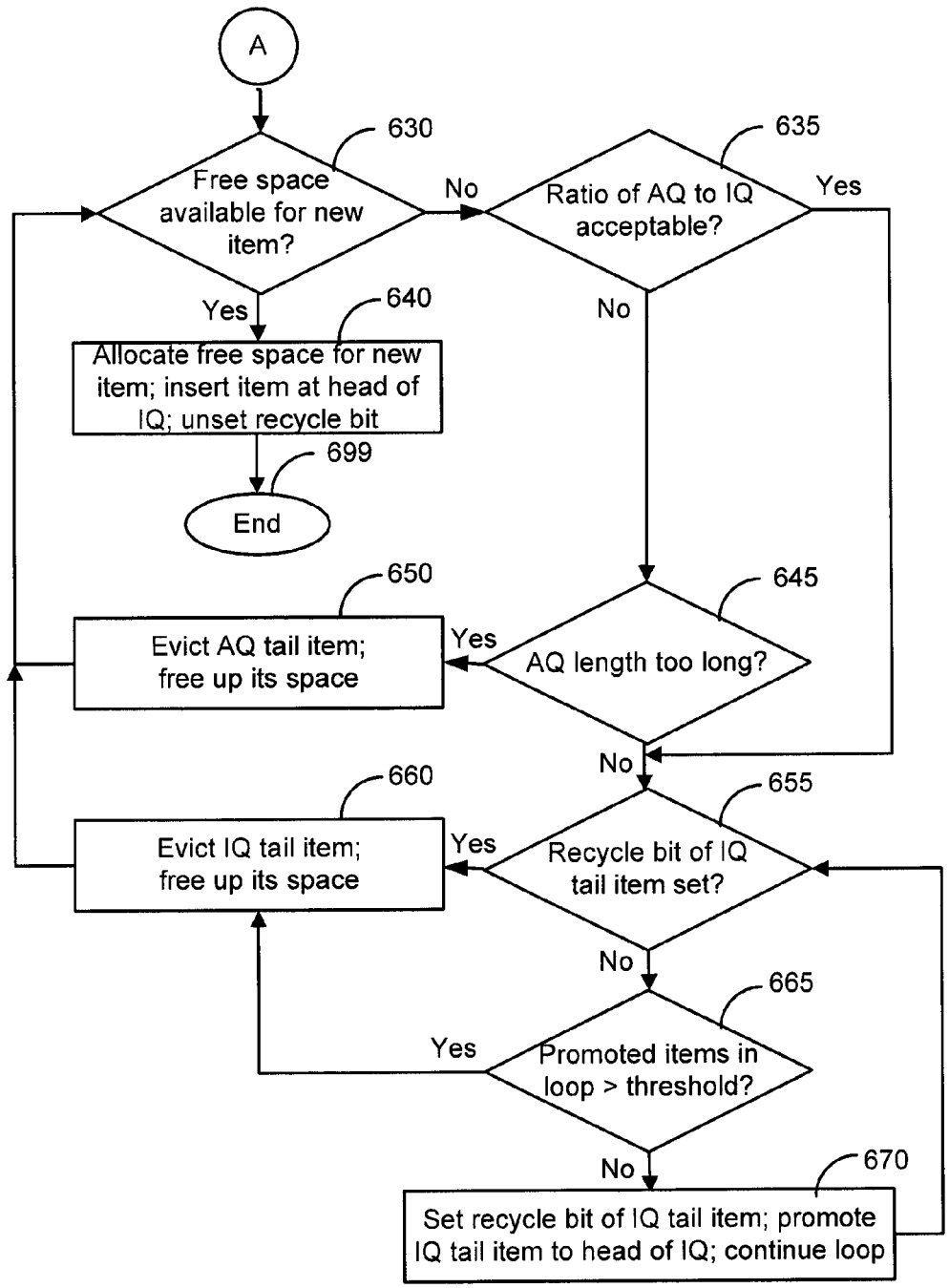

FIGS. 6A and 6B show a flow diagram illustrating an example process for implementing the recycling two queue algorithm. At block 605, the system receives a request for an item in the database. Then at decision block 610, the system determines whether the requested item is in the active queue (AQ) or the inactive queue (IQ). If the requested item is in one of the queues (block 610—Yes), at decision block 615, the system determines if the requested item is in the AQ. If the item is in the AQ (block 615—Yes), at block 620, the system moves the requested item to the head of the AQ, and the process ends at block 698.

If the requested item is in the IQ (block 615—No), at block 625, the system moves the item from the IQ to the head of the AQ. The process ends at block 698.

If the requested item is not in the AQ or IQ (block 610—No), at decision block 630, the system determines whether there is free space available in the cache for the requested item. If there is free space available in the cache (block 630—Yes), at block 640, the system allocates the free space for the requested item and inserts the requested item at the head of the IQ. At block 640, the recycle bit is also unset to ensure that the recycle bit is initialized for a newly requested item entering the cache. The process ends at block 699.

If there is no free space available in the cache (block 630—No), at decision block 635 the system determines if the ratio of the length of the AQ to the length of the IQ is within acceptable limits. The recycling two queue algorithm maintains a ratio of the length of the AQ to the length of the IQ within a certain range. If the ratio is too high, the length of the AQ is too long. If the ratio is too low, the length of the IQ is too long.

If the ratio is not within acceptable limits (block 635—No), at decision block 645, the system determines if the length of the AQ is too long. If the length of the AQ is too long (block 645—Yes), at block 650 the system evicts the tail item of the AQ to free up its space in the cache, and the process returns to decision block 630.

If the length of the IQ is too long (block 645—No), at decision block 655 the system determines if the recycle bit of the tail item of the IQ has been set. If the recycle bit has been set (block 655—Yes), at block 660 the system evicts the tail item of the IQ to free up its space in the cache, and the process returns to decision block 630.

If the recycle bit of the tail item of the IQ has not been set (block 655—No), at decision block 665, the system determines if the number of promoted items in the current loop is greater than a preset threshold value. The current loop includes the evaluation of the recycle bit of the tail items of the IQ to determine which item to evict. By setting a threshold value, the total number of evaluated items at the tail of the IQ is limited. If the number of items promoted in the current loop is greater than the threshold value (block 665—Yes), the process continues to block 660 to evict the current tail item of the IQ.

If the number of item promoted in the current loop is not greater than the threshold value (block 665—No), at block 670 the system sets the recycle bit of the tail item of the IQ, promotes the tail item of the IQ to the head of the IQ, and returns to decision block 655 to determine if the recycle bit of the new tail item of the IQ has been set.

For the decision block 635, if the ratio of the length of the AQ to the length of the IQ is acceptable (block 635—Yes), the process continues to decision block 655.

Other variants that use additional information, such as with lax LRU, can be implemented to increase an item's lifetime in the cache. For example, the reuse period or the reuse distance can be tracked and used for determining whether a re-accessed item should be promoted in one of the queues, and if so, how far the item should be promoted.

Some other variations are discussed below and are applicable to both prolonging the lifetime of a hot item in the cache and decreasing the time a cold item spends in the cache. Variations can be used in addition to or instead of other variations.

Items from the same family might have spatial locality, indicating that these items might be accessed simultaneously. Here, the term 'family' means an application-dependent semantic closeness between the items, such as two keys with the same prefix in Memcached. The spatial locality information can be taken into account, either from the perspective of item eviction or item promotion within the cache queue. For example, when an item would be evicted, if other items in the same family stay near the head of the queue, the item to be evicted might be permitted to stay in the cache via recycling. Or when an item is promoted within the queue, some of the other items in the same family might also be promoted. A more detailed heuristic can be used to determine the degree of relatedness of the items in the same family.

The basic cache replacement policies do not incorporate information about the relative cost of cache misses for different keys. For example, some of the misses might trigger access to the hard drives, thus causing high latency to clients, while some other misses might not. Cache policies can be combined with miss penalty information into a cost function to help the system decide when to extend items in the cache, such as with the recycling two queue algorithm, or to retard their promotion for quicker eviction, such as with lax LRU.

Just as the lax LRU algorithm can employ various heuristics and algorithms to dynamically tune and adjust any of its runtime parameters such as "promotion time window" or "promotion distance," the recycling two queue algorithm can dynamically self-tune its own parameters, such as the ratio between the length of the active and inactive queues.

An alternative to fixed or self-tuning parameters is to use stochastic and probabilistic choices, in an attempt to better predict the expected lifetime of an item, as opposed to an absolute lifetime. Examples of probabilistic choices are coin-flip (e.g., an inactive item is recycled with only a probability of 40%); clustering and decision trees that characterize items by several features and make an eviction decision based on a probabilistic function of the features; or Markov chains where the algorithm tries to dynamically identify and categorize access patterns.

The goal of a cache replacement policy is to predict, at the moment an eviction from the queue is necessary, which item is unlikely to be recalled again soon. Such prediction is probabilistic and typically operates on a stochastic stream of inputs, and thus, is not 100% accurate. The accuracy can be improved by analyzing and including additional features of items and computations on those items. Some of these enhancements, such as the lax LRU variants, focus on identifying cold items, while others focus on identifying the hot items. But these efforts are complementary since evicting cold items first leaves the hot items around longer, and vice versa.

Figure 7:
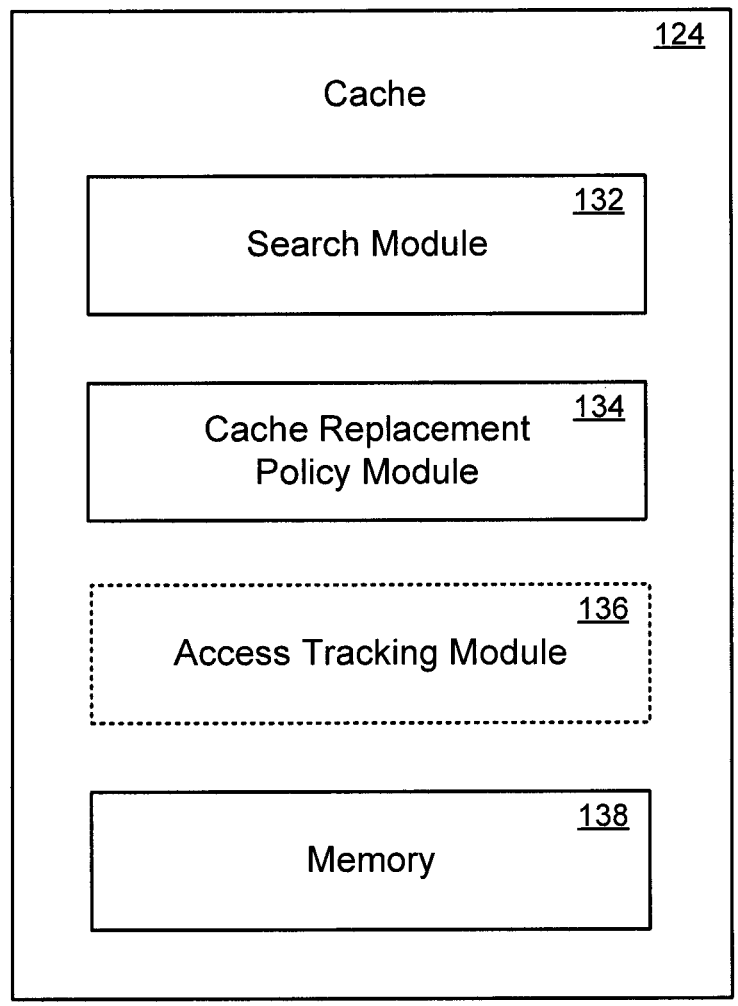
FIG. 7 depicts an architecture of a cache according to an embodiment of the present disclosure.

FIG. 7 is an example of an architecture of one of the caches 124, 126 configured, for example, to receive requests for data stored in the cache. In the example of FIG. 7, the cache 124 (and all of the elements included within the cache 124), or equivalently, cache 126 is implemented by using programmable circuitry programmed by software and/or firmware, or by using special-purpose hardwired circuitry, or by using a combination of such embodiments.

In the example of FIG. 7, the cache 124 includes a search module 132, a cache replacement policy module 134, an access tracking module 136, and a memory 138. Additional or fewer components or modules can be included in the cache 124 and each illustrated component.

As used herein, a "module" includes a general purpose, dedicated or shared processor and, typically, firmware or software modules that are executed by the processor. Depending upon implementation-specific or other considerations, the module can be centralized or its functionality distributed. The module can include general or special purpose hardware, firmware, or software embodied in a computer-readable (storage) medium for execution by the processor. As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

In one embodiment, the cache 124 includes a search module 132 configured to search through the memory 138 to determine whether a requested data object is stored in the cache. The search module 132 can identify in which queue a requested item is found, such as the active queue or inactive queue if more than one queue is used by the cache replacement policy module 134.

In one embodiment, the cache 124 includes a cache replacement policy module 134 configured to execute a particular caching algorithm that determines which items should be evicted from the queues maintained in memory 138, whether an item should be promoted in a queue or moved to a different queue, and how far upward an item should be promoted within a queue. If the cache replacement policy module 134 executes a caching algorithm that is based on reuse period or reuse distance, it obtains the information from the access tracking module 136. The cache replacement policy module 134 can also fit reuse period data or reuse distance to a function for use in executing a caching algorithm. The cache replacement policy module 134 can also run search and optimization algorithms to optimize internally set parameters, as needed.

In one embodiment, the cache 124 includes an optional access tracking module 136 configured to access information stored in memory 138 for an item for calculating a reuse period or reuse distance for use by the cache replacement policy module 134.

In one embodiment, the cache 124 includes a memory 138 configured to store accessed items in one or more queues for implementing a cache replacement policy. The memory 138 can also store additional information such as the access time of the item, the reuse period, and/or the reuse distance as calculated by the reuse period module 134 to use in determining whether to promote an accessed item, how far upward in a queue an item should be promoted, and whether an item should be evicted from queue. The information stored in the memory 138 can be used by the other modules in the cache 124.

Social Networking System Architecture

As mentioned above, embodiments of the present invention can be utilized within a social networking system. Typically, a social networking system includes one or more computing devices storing user profiles associated with users and/or other objects as well as connections between users and other users and/or objects. In use, users join the social networking system and then add connections to other users or objects of the social networking system to which they desire to be connected. The users may be individuals or entities such as businesses, organizations, universities, manufacturers. The social networking system allows its users to interact with each other as well as with other objects maintained by the social networking system. In some embodiments, the social networking system allows users to interact with third-party websites and financial account providers.

Based on stored data about users, objects and connections between users and/or objects, the social networking system can generate and maintain a "social graph" comprising a plurality of nodes interconnected by a plurality of edges. Each node in the social graph represents an object or user that can act on another node and/or that can be acted on by another node. An edge between two nodes in the social graph represents a particular kind of connection between the two nodes, which may result from an action that was performed by one of the nodes on the other node. For example, when a user identifies an additional user as a friend, an edge in the social graph is generated connecting a node representing the first user and an additional node representing the additional user. The generated edge has a connection type indicating that the users are friends. As various nodes interact with each other, the social networking system can modify edges connecting the various nodes to reflect the interactions.

Figure 8:
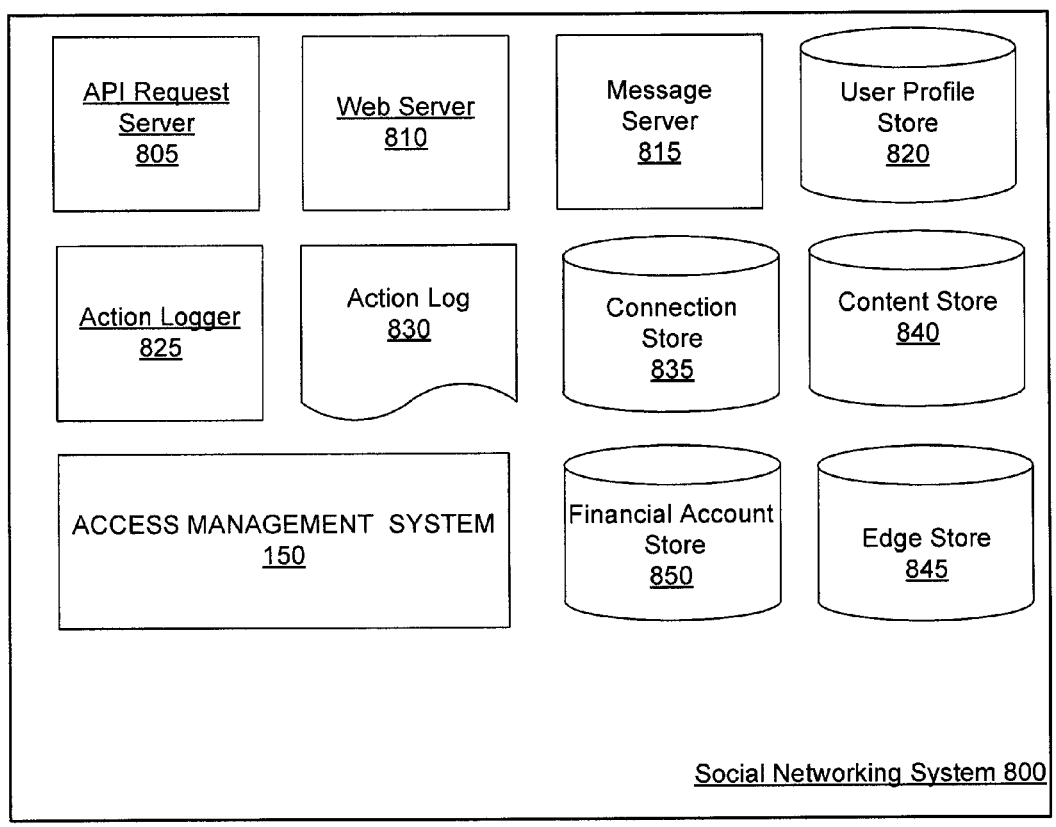
FIG. 8 is a block diagram of a system architecture of the social networking system with which some embodiments of the present invention may be utilized.

FIG. 8 is a block diagram of a system architecture of the social networking system 800 with which some embodiments of the present invention may be utilized. Social networking system 800 illustrated by FIG. 8 includes API request server 805, web server 810, message server 815, user profile store 820, action logger 825, action log 830, connection store 835, content store 840, edge store 845, and financial account store 850. Information in the user profile store 820, content store 840, connection store 835, edge store 845, financial account store 850, and/or action log 830 can be stored in a data center 120, 130 database 126, 136. Data accessed from a database 126, 136 can be stored in cache 124, 134 using one of the caching algorithms described herein. In other embodiments, social networking system 800 may include additional, fewer, or different modules for various applications. Conventional components such as network interfaces, security mechanisms, load balancers, failover servers, management and network operations consoles, and the like are not shown so as to not obscure the details of the system architecture.

API request server 805 allows other systems, user devices, or tools to access information from social networking system 800 by calling APIs. The information provided by the social network may include user profile information or the connection information of users as determined by their individual privacy settings. For example, a system, user device, or tools interested in accessing data connections within a social networking system may send an API request to social networking system 800 via a network. The API request is received at social networking system 800 by API request server 805. API request server 805 processes the request by submitting the access request to access management system 150 where access is determined and any data communicated back to the requesting system, user device, or tools via a network.

Web server 810 links social networking system 800 via a network to one or more client devices; the web server serves web pages, as well as other web-related content, such as Java, Flash, XML, and so forth. The web server 810 may communicate with the message server 815 that provides the functionality of receiving and routing messages between social networking system 800 and client devices. The messages processed by message server 815 can be instant messages, queued messages (e.g., email), text and SMS (short message service) messages, or any other suitable messaging technique. In some embodiments, a message sent by a user to another can be viewed by other users of social networking system 800, for example, by the connections of the user receiving the message. An example of a type of message that can be viewed by other users of the social networking system besides the recipient of the message is a wall post. In some embodiments, a user can send a private message to another user that can only be retrieved by the other user.

Each user of the social networking system 800 is associated with a user profile, which is stored in user profile store 820. A user profile includes declarative information about the user that was explicitly shared by the user, and may also include profile information inferred by social networking system 800. In one embodiment, a user profile includes multiple data fields, each data field describing one or more attributes of the corresponding user of social networking system 800. The user profile information stored in user profile store 820 describes the users of social networking system 800, including biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of social networking system 800 displayed in an image. A user profile in user profile store 820 may also maintain references to actions by the corresponding user performed on content items in content store 840 and stored in the edge store 845.

A user profile may be associated with one or more financial accounts, allowing the user profile to include data retrieved from or derived from a financial account. A user may specify one or more privacy settings, which are stored in the user profile, that limit information from a financial account that social networking system 800 is permitted to access. For example, a privacy setting limits social networking system 800 to accessing the transaction history of the financial account and not the current account balance. As another example, a privacy setting limits social networking system 800 to a subset of the transaction history of the financial account, allowing social networking system 800 to access transactions within a specified time range, transactions involving less than a threshold transaction amounts, transactions associated with specified vendor identifiers, transactions associated with vendor identifiers other than specified vendor identifiers or any suitable criteria limiting information from a financial account identified by a user that is accessible by social networking system 800. In one embodiment, information from the financial account is stored in user profile store 820. In other embodiments, it may be stored in financial account store 850.

Action logger 825 receives communications about user actions on and/or off social networking system 800, populating action log 830 with information about user actions. Such actions may include, for example, adding a connection to another user, sending a message to another user, uploading an image, reading a message from another user, viewing content associated with another user, attending an event posted by another user, among others. In some embodiments, action logger 825 receives, subject to one or more privacy settings, transaction information from a financial account associated with a user and identifies user actions from the transaction information. For example, action logger 825 retrieves vendor identifiers from the financial account's transaction history and identifies an object, such as a page, in social networking system 800 associated with the vendor identifier. This allows action logger 825 to identify a user's purchases of products or services that are associated with a page, or another object, in content store 840. In addition, a number of actions described in connection with other objects are directed at particular users, so these actions are associated with those users as well. These actions are stored in action log 830.

Action log 830 may be used by social networking system 800 to track user actions on social networking system 800, as well as external website that communicate information to social networking system 800. Users may interact with various objects on social networking system 800, including commenting on posts, sharing links, and checking-in to physical locations via a mobile device, accessing content items in a sequence or other interactions. Information describing these actions is stored in action log 830. Additional examples of interactions with objects on social networking system 800 included in action log 830 include commenting on a photo album, communications between users, becoming a fan of a musician, adding an event to a calendar, joining a groups, becoming a fan of a brand page, creating an event, authorizing an application, using an application and engaging in a transaction. Additionally, action log 830 records a user's interactions with advertisements on social networking system 800 as well as other applications operating on social networking system 800. In some embodiments, data from action log 830 is used to infer interests or preferences of the user, augmenting the interests included in the user profile and allowing a more complete understanding of user preferences.

Action log 830 may also store user actions taken on external websites and/or determined from a financial account associated with the user. For example, an e-commerce website that primarily sells sporting equipment at bargain prices may recognize a user of social networking system 800 through social plug-ins that enable the e-commerce website to identify the user of social networking system 800. Because users of social networking system 800 are uniquely identifiable, e-commerce websites, such as this sporting equipment retailer, may use the information about these users as they visit their websites. Action log 830 records data about these users, including webpage viewing histories, advertisements that were engaged, purchases made, and other patterns from shopping and buying. Actions identified by action logger 825 from the transaction history of a financial account associated with the user allow action log 830 to record further information about additional types of user actions.

Content store 840 stores content items associated with a user profile, such as images, videos or audio files. Content items from content store 840 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users, to invite new users to the system or to increase interaction with the social network system by displaying content related to users, objects, activities, or functionalities of social networking system 800. Examples of social networking content items include suggested connections or suggestions to perform other actions, media provided to, or maintained by, social networking system 800 (e.g., pictures or videos), status messages or links posted by users to the social networking system, events, groups, pages (e.g., representing an organization or commercial entity), and any other content provided by, or accessible via, the social networking system.

Content store 840 also includes one or more pages associated with entities having user profiles in user profile store 820. An entity is a non-individual user of social networking system 800, such as a business, a vendor, an organization or a university. A page includes content associated with an entity and instructions for presenting the content to a social networking system user. For example, a page identifies content associated with the entity's user profile as well as information describing how to present the content to users viewing the brand page. Vendors may be associated with pages in content store 840, allowing social networking system users to more easily interact with the vendor via social networking system 800. A vendor identifier is associated with a vendor's page, allowing social networking system 800 to identify the vendor and/or to retrieve additional information about the vendor from user profile store 820, action log 830 or from any other suitable source using the vendor identifier. In some embodiments, the content store 840 may also store one or more targeting criteria associated with stored objects and identifying one or more characteristics of a user to which the object is eligible to be presented.

In one embodiment, edge store 845 stores the information describing connections between users and other objects on social networking system 800 in edge objects. Some edges may be defined by users, allowing users to specify their relationships with other users. For example, users may generate edges with other users that parallel the users' real-life relationships, such as friends, co-workers, partners, and so forth. Other edges are generated when users interact with objects in social networking system 800, such as expressing interest in a page on the social networking system, sharing a link with other users of the social networking system, and commenting on posts made by other users of the social networking system. Edge store 845 stores edge objects that include information about the edge, such as affinity scores for objects, interests, and other users. Affinity scores may be computed by social networking system 800 over time to approximate a user's affinity for an object, interest, and other users in social networking system 800 based on the actions performed by the user. Multiple interactions between a user and a specific object may be stored in one edge object in edge store 845, in one embodiment. In some embodiments, connections between users may be stored in user profile store 820, or user profile store 820 may access edge store 845 to determine connections between users.

Figure 9:
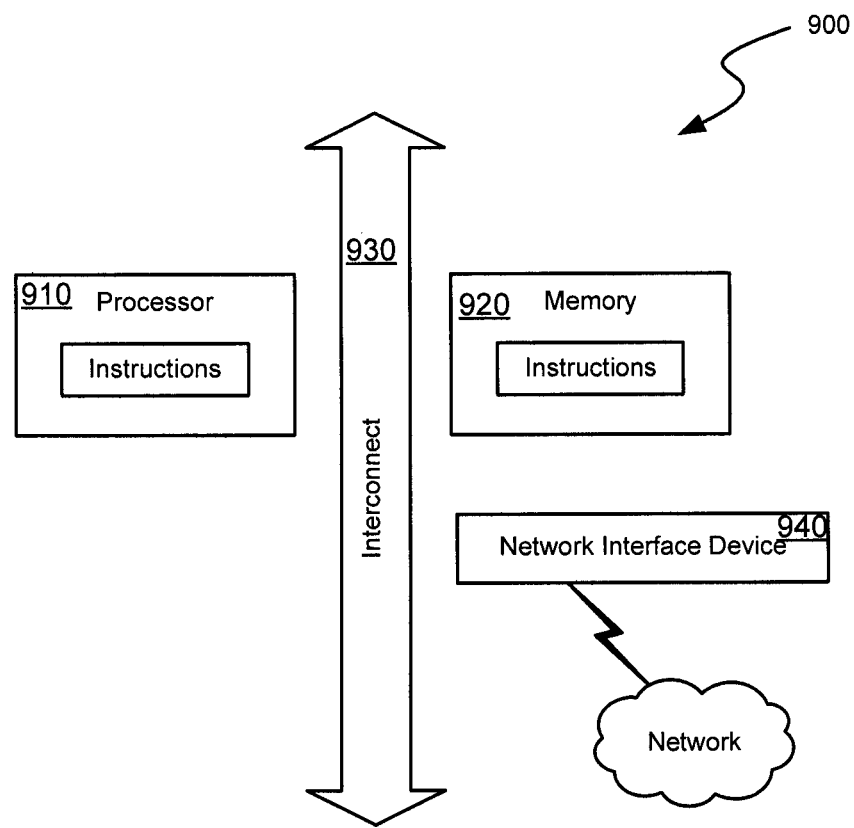
FIG. 9 is a block diagram showing an example of the architecture for a system that can be used to implement the cache algorithms according to an embodiment of the present disclosure.

FIG. 9 is a block diagram showing an example of the architecture for a system 900 that can be used to implement the cache algorithms described herein. The system 900 can reside in the cache.

In FIG. 9, the system 900 includes one or more processors 910 and memory 920 connected via an interconnect 930. The processor(s) 910 can include central processing units (CPUs) that can execute software or firmware stored in memory 920. For example, the processor(s) 910 can perform the functions of the search module 132, the cache replacement policy module 134, and/or the access tracking module 136. The processor(s) 910 may be, or may include, one or more programmable general-purpose or special-purpose microprocessors, digital signal processors (DSPs), programmable, application specific integrated circuits (ASICs), programmable logic devices (PLDs), or the like, or a combination of such devices.

The memory 920 represents any form of memory, such as random access memory (RAM), read-only memory (ROM), flash memory, or a combination of such devices. In use, the memory 920 can contain, among other things, a set of machine instructions which, when executed by processor 910, causes the processor 910 to perform operations to implement embodiments of the present invention, and the data stored in the memory 138 used for executing the caching algorithms.

The interconnect 930 is an abstraction that represents any one or more separate physical buses, point to point connections, or both connected by appropriate bridges, adapters, or controllers. The interconnect 930, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 694 bus, sometimes referred to as "Firewire".

Also connected to the processor(s) 910 through the interconnect 930 is a network interface device 940. The network interface device 940 can provide the system 900 with the ability to communicate with remote devices, such as remote devices accessing the cache 124, 134, and may be, for example, an Ethernet adapter or Fiber Channel adapter.

CONCLUSION

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or subcombinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms. For example, while only one aspect of the invention may be recited, in an example, as a means-plus-function claim under 35 U.S.C. §112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for.") Accordingly, the applicant reserves the right to add additional claims after filing the application to pursue such additional claim forms for other aspects of the invention.

We claim:

1. A method, comprising:
    receiving a request for an item stored in a cache queue;
    promoting the item to a specified position within the cache queue in an event the item satisfies at least one criterion of multiple criteria, wherein the multiple criteria include a reuse period of the item and a reuse distance of the item, wherein the reuse period is an elapsed time between two consecutive accesses of the item, and wherein the reuse distance is a number of different items accessed between the two consecutive accesses of the item, wherein promoting the item to the specified position includes promoting the item to a head of the cache queue; and
    otherwise maintaining a location of the item in the cache queue in an event the item does not satisfy any of the reuse period and the reuse distance.

2. The method of claim 1, wherein the multiple criteria further include a second criterion, wherein the second criterion is that the item is within a threshold of a head of the cache queue.

3. The method of claim 1, wherein promoting the item to the specified position includes promoting the item by a fixed number of positions upward in the cache queue.

4. The method of claim 1, wherein the multiple criteria further include a second criterion, wherein the second criterion is that the item is outside a threshold of a head of the cache queue.

5. The method of claim 1, wherein the item is promoted upward a number of positions that is substantially inversely proportional to a latest reuse period for the item.

6. The method of claim 1, further comprising fitting reuse periods or reuse distances of the item to a function, and based on the function, determining an estimate when a next access will occur, and promoting the item in the cache queue based on the estimate.

7. The method of claim 1, further comprising:
    identifying temporal access patterns of a plurality of items;
    adjusting the multiple criteria based on the identified temporal access patterns.

8. The method of claim 1, further comprising:
    tracking a hit rate of multiple requested items;
    applying a search and optimization algorithm to adjust the multiple criteria to increase the hit rate.

9. The method of claim 1, further comprising:
    maintaining a cost function based on miss penalty information, wherein a promotion of the requested item within the cache queue of the requested item is based on miss penalty information for the item.

10. The method of claim 1, further comprising:
    identifying whether an existing item in the cache queue has spatial locality with a family of one or more other items,
    wherein in an event the existing item is to be evicted from a tail of the cache queue, and the existing item has spatial locality with the family of one or more other items near a head of the cache queue, the existing item is promoted within the cache queue, and
    wherein in an event the existing item is promoted within the cache queue, the family of one or more other items with which the requested item has spatial locality are also promoted within the cache queue.

11. A method, comprising:
    maintaining an active queue and an inactive queue in a cache, the active queue having a first plurality of items, the inactive queue having a second plurality of items;

receiving a request for an item;
placing the requested item within the inactive queue of the cache in an event requested item is not already stored in the active queue or the inactive queue of the cache;
moving the requested item to a head of the active queue in an event the requested item is already stored in the inactive queue;
promoting the requested item to a specified position within the active queue of the cache in an event the requested item is already stored in the active queue; and
evicting an existing item from the cache, wherein the existing item is selected for eviction from:
  a tail of the active queue in an event a ratio of a length of the active queue to the inactive queue exceeds a specified range, the existing item evicted from the cache without further being stored in the inactive queue, and
  a tail of the inactive queue in an event the ratio is below the specified range.

12. The method of claim 11, further comprising:
maintaining a recycle bit for each item in the cache, wherein the recycle bit is initially unset,
wherein in an event the tail item of the inactive queue is selected to be evicted and the recycle bit for the tail item is unset, the recycle bit is set and the item is promoted within the inactive queue, and
further wherein in an event the recycle bit for the tail item is set, the tail item is evicted.

13. The method of claim 11, further comprising setting a recycle bit of each item in the active queue.

14. The method of claim 11, further comprising:
maintaining a reuse period of each item in the cache;
wherein the reuse period is an elapsed time between two consecutive accesses of the item; and
wherein the reuse period is used to determine the position within the active queue to which the requested item that is already stored in the cache is promoted.

15. The method of claim 11, further comprising:
maintaining a cost function based on miss penalty information, wherein a promotion location of the requested item in the cache is based on miss penalty information for the item.

16. The method of claim 11, further comprising:
maintaining a reuse distance of each item in the cache;
wherein the reuse distance is a number of different items accessed between two consecutive accesses of the item; and
wherein the reuse distance is used to determine the position within the active queue to which the requested item that is already stored in the cache is promoted.

17. The method of claim 11, further comprising:
identifying whether the requested item has spatial locality with a family of one or more other items;
in an event the requested item is selected to be evicted from the cache, and the requested item has spatial locality with the family of one or more other items near a head of the active queue or of the inactive queue, recycling the requested item to stay in the cache; and
in an event the requested item is promoted within the active queue or the inactive queue, promoting the family of one or more other items with which the requested item has spatial locality.

18. A non-transitory computer readable storage medium storing instructions, comprising:
instructions for receiving a request for an item stored in a cache queue, the cache queue including an active queue and an inactive queue, the active queue having a first plurality of items, the inactive queue having a second plurality of items;
instructions for promoting the requested item to a head of the cache queue in an event the requested item satisfies a criterion and is in the active queue, the head of the cache queue being within the active queue of the cache queue, wherein the cache queue is configured to evict one of the first plurality of items from the active queue without further being stored in the inactive queue, wherein the cache queue is configured to evict a specified item from the active queue or the inactive queue based on a ratio of the length of the active queue to the inactive queue;
instructions for moving the requested item to the head of the active queue in an event the requested item is already stored in the inactive queue;
instructions for associating every item in the cache queue with a recycle bit, wherein the recycle bit associated with each item is initially unset at zero;
instructions for determining, in an event a tail item of the cache queue is to be evicted, whether the recycle bit for the tail item has been set; and
instructions for, in an event the recycle bit for the tail item has not been set:
  setting the recycle bit for the tail item; and
  promoting the tail item to a head of the inactive queue of the cache queue; and
  instructions for evicting the tail item from the cache queue in an event the recycle bit for the tail item has been set.

19. The non-transitory computer readable storage medium of claim 18, wherein the criterion is that the requested item is within a threshold distance of the head of the cache queue, wherein a portion of the cache queue in the threshold distance is the active queue of the cache queue.

20. The non-transitory computer readable storage medium of claim 18, further comprising:
instructions for placing the requested item within the inactive queue of the cache queue in an event the requested item is not already stored in either the active queue or the inactive queue of the cache queue;
instructions for inserting the requested item in the active queue of the cache queue in an event the requested item is already stored in the cache queue; and
instructions for maintaining the ratio within the specified range by evicting an existing item from the cache queue, wherein the existing item is evicted from the active queue in an event the ratio exceeds the specified range and from the inactive queue in an event the ratio is below the specified range.

* * * * *